June 28, 1927.
H. AHLRICHS
POULTRY FEEDER
Filed Oct. 28, 1926
1,633,880
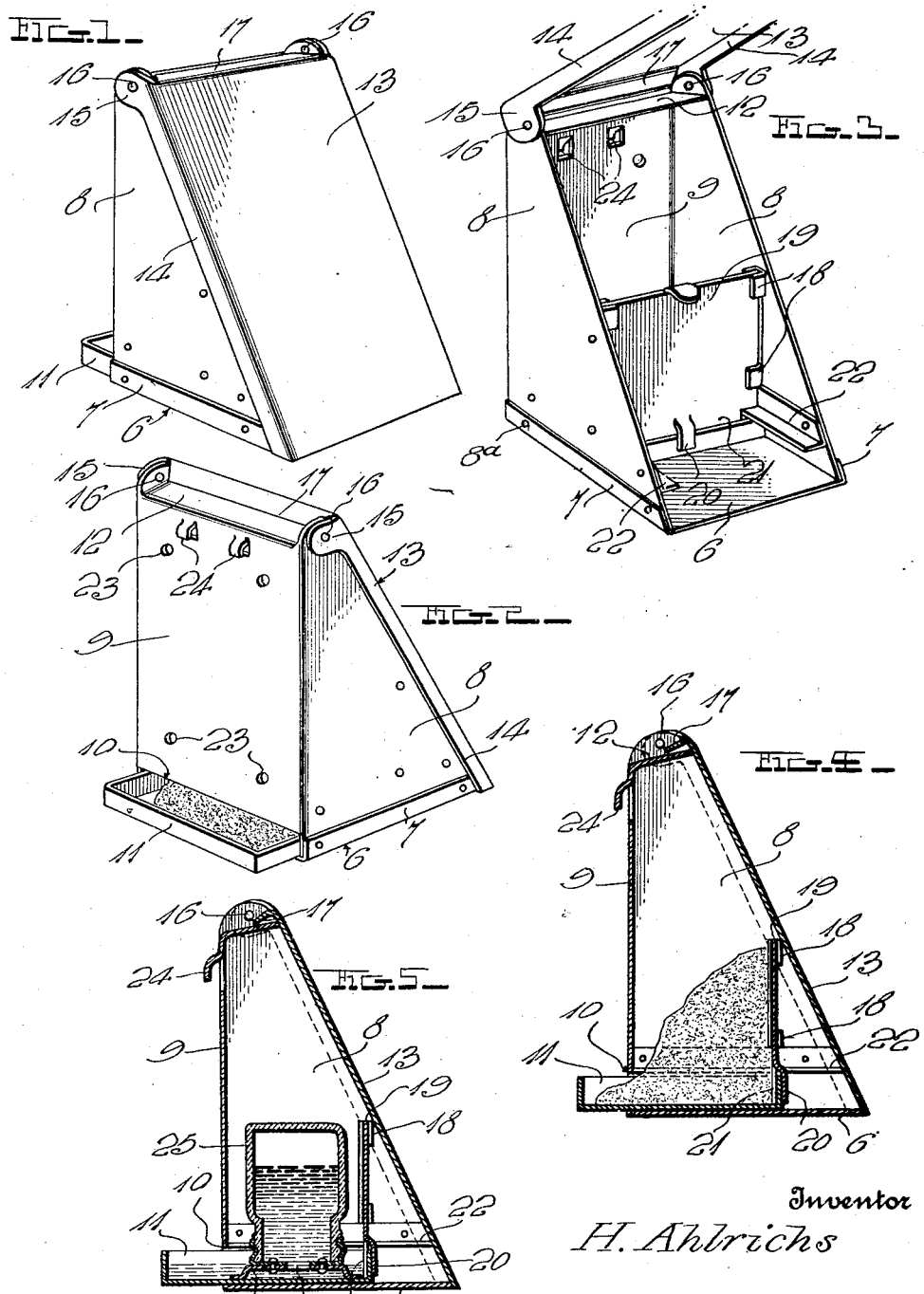
Inventor
*H. Ahlrichs*
By
Attorneys Patented June 28, 1927.

1,633,880

UNITED STATES PATENT OFFICE.

HARM AHLRICHS, OF SHERMAN, ILLINOIS.

POULTRY FEEDER.

Application filed October 28, 1926. Serial No. 144,786.

The invention relates to new and improved construction for poultry feeders and the present disclosure is directed to a device which may also be used as a watering fountain if desired.

It is one object of the invention to provide a device of the class set forth which will be exceptionally simple and inexpensive, may readily be mounted at the outside of a poultry house with the feed or water pan projecting into the latter through a slot, and when so mounted, will effectively exclude rain and the like, so that the feed cannot be materially injured by inclement weather.

In carrying out the invention, a container is provided having a slot through which the feed or water pan may be partially projected, and said container is provided with an outwardly swingable wall portion for giving access to its interior, and a further aim of the invention is to provide within the container, a vertically slidable partition which acts as part of feed-retaining means and acts also to hold the pan when in its partly projected position.

With the foregoing in view, the invention resides in the novel subject matter hereinafter described and claimed, the description being supplemented by the accompanying drawing.

Fig. 1 is a perspective view of the device looking toward the rear thereof.

Fig. 2 is a perspective looking toward the front of the device.

Fig. 3 is a view similar to Fig. 1 but showing the rear wall swung upwardly.

Fig. 4 is a vertical sectional view.

Fig. 5 is a view similar to Fig. 4 but illustrating the device in use as a watering fountain.

In the drawing above briefly described, I have illustrated the preferred form of construction, and while this construction will be hereinafter specifically described, it is to be understood at the outset that minor changes may be made within the scope of the invention as claimed.

The numeral 6 designates a rectangular, horizontal bottom, said bottom having upstanding flanges 7 to which a pair of triangular side walls 8 are secured by rivets or the like 8ª. These side walls have vertical front edges and forwardly inclined rear edges, and they are preferably integral with a front wall 9. This front wall terminates above the bottom 6, leaving a slot 10 through which to project the front portion of a pan 11. At its upper end, the front wall 9 is rearwardly bent, providing a narrow top 12 which inclines rearwardly and is spaced downwardly from the upper extremities of the side walls 8. A back wall 13 contacts with the inclined edges of the side walls 8 and is provided with vertically extending flanges 14 which lie against the outer faces of said side walls. The upper ends of these flanges 14 are preferably widened somewhat to provide ears 15, which ears are pivoted by rivets or the like 16, to the portions of the side walls 8 which project above the top 12. The upper end of the back wall 13 is forwardly bent to provide a flange 17 which lies upon the top 12 and is inclined rearwardly, so that said top and flange jointly form a comparatively tight closure for the upper end of the container, excluding rain and the like. By spacing the top 12 downwardly from the upper extremities of the side walls 8 and positioning the pivots 16 slightly above said top, ease in manufacture is afforded and when either rivets or bolts are used for these pivots, they are readily accessible when assembling.

The opposed inner sides of the walls 8 are provided with suitable means 18 forming vertical guideways for a vertical partition 19, and in the present disclosure, the lower end of this partition is vertically split and suitably bent to provide fingers 20 and 21 which will straddle the rear wall of the pan 11, when the latter is partially projected through the slot 10. The partition 19 coacts with adjacent portions of the walls 8 and with the front wall 9, in forming a feed compartment, and in addition to performing this function, it serves to hold the pan 11 against accidental sliding, when it is in operative position. Moreover, before the device is installed, for instance, when it is in stock in a store or during shipment, the lower end of the partition 19 may rest within the pan 11, preventing accidental sliding of the latter out of the opening 10.

Preferably, the pan 11 rests slidably upon the bottom 6 and is held against any upward movement by suitable angle strips or the like 22, secured to the walls 8.

The device may be secured to the outer side of a poultry house by passing fasteners through the openings 23 or by engaging the hooks 24 with staples or the like. Then, the projecting portion of the pan 11 will pass through a slot in the poultry house into the interior of the latter. Thus, while the poultry may have access to the pan to feed therefrom, they cannot climb into it or scratch the feed therefrom.

If desired, instead of using the device as a feeder, it may be used as a fountain, by placing a suitable water container 25 therein. The container shown is provided with an arched base 26 to rest upon the bottom of the pan 11, and the bottom of the container is formed with an opening 27. Whenever the water level in the pan 11 recedes sufficiently to permit some air to enter the container 25 through this opening, more water will discharge in the usual way.

On account of the existing advantages for the details of construction herein disclosed, they are preferably followed. However, within the scope of the invention as claimed, variations may be made. Sheet metal is preferably used throughout and the device may be constructed from any desired number of sections suitably secured together.

I claim:—

1. In a device of the class described, a substantially weather tight container consisting of a bottom, a pair of triangular side walls rising therefrom and having vertical front edges and rear edges which incline forwardly, a vertical front wall terminating in upwardly spaced relation with said bottom leaving a space to accommodate a pan, a narrow top between the upper end portions of said side walls and downwardly spaced from their upper extremities, said top inclining rearwardly, a back wall contacting with said inclined rear edges of said side walls and having flanges lying against the outer sides of the latter, the upper end of said back wall having a forwardly projecting rearwardly inclined flange lying on said rearwardly inclined top, and pivots connecting the upper ends of the first named flanges with the upper ends of said side walls at points somewhat above said top, said pivots permitting rearward and upward swinging of said back wall.

2. In a device of the class described, a container having a slot at the lower end of one wall, said container being provided with an outwardly movable wall for giving access to its interior, opposed sides of said container having vertical guideways, a pan in the container projectible partially through said slot, and a vertical partition slidably engaged with said vertical guideways, the lower end of said partition having means to engage the rear wall of the pan when the latter is projected through said slot, whereby to hold the pan against accidental sliding.

3. In a device of the class described, a container having a slot at the lower end of one wall, said container being provided with an outwardly movable wall for giving access to its interior, opposed sides of said container having vertical guideways, a pan in the container projectible partially through said slot, and a vertical partition slidably engaged with said vertical guideways, the lower end of said partition having fingers to straddle the rear wall of the pan when the latter is projected through said slot, whereby to hold the pan against accidental sliding.

4. In a device of the class described, a container having a slot at the lower end of one wall, said container being provided with an outwardly movable wall for giving access to its interior, opposed sides of said container having vertical guideways, a removable pan slidably receivable in the container and projectible partially through said slot, and a vertical partition slidably engaged with said vertical guideways, the lower end of said partition having means to engage the rear wall of the pan when the latter is projected through said slot, whereby to hold the pan against accidental sliding.

In testimony whereof I have hereunto affixed my signature.

HARM AHLRICHS.